(12) United States Patent
Wiesemann et al.

(10) Patent No.: US 6,194,074 B1
(45) Date of Patent: Feb. 27, 2001

(54) GASKET WITH CORROSION INHIBITOR

(76) Inventors: Amadeus Wiesemann, Bergring 2a, 91166 Georgensgmünd; Hans-Jörg Rüsch, Egerweg 8, 85521 Ottobrunn; Wolfgang Walter, Mörickestr 10, 72175 Dornhan; Wolfgang Bürger, Böcklerweg 30, 81825 Munich; Reinhold Holbein, Finkenweg 4, 88048 Friedrichshafen, all of (DE)

( * ) Notice: Subject to any disclaimer, the term of this patent is extended or adjusted under 35 U.S.C. 154(b) by 0 days.

(21) Appl. No.: 09/142,805

(22) PCT Filed: Feb. 21, 1997

(86) PCT No.: PCT/EP97/00848

§ 371 Date: Mar. 3, 1999

§ 102(e) Date: Mar. 3, 1999

(87) PCT Pub. No.: WO97/33949

PCT Pub. Date: Sep. 18, 1997

(30) Foreign Application Priority Data

Mar. 13, 1996 (EP) .............................................. 96 103 932

(51) Int. Cl.$^7$ ...................................................... B32B 27/00
(52) U.S. Cl. ............................................................. 428/422
(58) Field of Search .............................. 523/206; 428/422

(56) References Cited

U.S. PATENT DOCUMENTS

| 4,028,324 | 6/1977 | Tuschner et al. ................ 260/33.8 F |
| 5,192,310 | * 3/1993 | Herweck et al. ......................... 623/1 |
| 5,869,156 | 2/1999 | Chung et al. ....................... 428/35.7 |

FOREIGN PATENT DOCUMENTS

| 44 23 043 | 1/1996 | (DE) . |
| 0 303 102 | 2/1989 | (EP) . |
| 0 615 779 | 9/1994 | (EP) . |
| 0 730 017 | 9/1996 | (EP) . |
| 51-050963 | 5/1976 | (JP) . |
| 59-232163 | 6/1983 | (JP) . |
| 61-163 944 | 7/1986 | (JP) . |
| 62-027485 | 2/1987 | (JP) . |
| 62-074998 | 4/1987 | (JP) . |
| 63-224728 | 9/1988 | (JP) . |
| 64-014291 | 1/1989 | (JP) . |
| 3-017562 | 3/1991 | (JP) . |
| 4/081489 | 3/1992 | (JP) . |
| 6 247 473 | 9/1994 | (JP) . |
| 7-501347 | 2/1995 | (JP) . |
| 8 209114 | 12/1996 | (JP) . |
| 872 874 | 10/1981 | (SU) . |
| 92/21715 | 12/1992 | (WO) . |
| 94/26960 | 11/1994 | (WO) . |

* cited by examiner

*Primary Examiner*—Kriellion Sanders
(74) *Attorney, Agent, or Firm*—Allan M. Wheatcraft (57) ABSTRACT

The functioning of an aircraft is dependent on numerous mechanical, hydraulic and electronic systems. Access to these systems, for example for maintenance purposes, can often only be made from the outside or inside of the aircraft by removing panels. In order to protect the systems from environmental influences such as water ingress, a reliable panel sealant is required. A sealant material has been developed which before use consists essentially of a) 30–90% by weight porous base material and b) 10–70% by weight corrosion inhibitor having the requirements that it is compatible with saud porous material and has a group which is polar in nature. Preferably the porous base material is expanded polytetrafluorethylene. Further disclosed is a method for manufacturing sealantg material with anti-corrosion properties comprising the following steps: a) a first step of manufacturing a porous base sealant material (90), b) a second step of preparing a fluid (70) of a corrosion inhibitor, c) a third step of applying said fluid to said base sealant material (90) and d) a fourth step of drying the base sealant material to form the sealant material with anti-corrosion properties.

14 Claims, 6 Drawing Sheets

Al-alloy 2024
68 days alternate immersion
in 3.5% NaCl
Sealing tape without inhibitors

Fig. 6A

Al-alloy 2024
68 days alternate immersion
in 3.5% NaCl
Sealing tape with inhibitors

GASKET WITH CORROSION INHIBITOR

The functioning of an aircraft is dependent on numerous mechanical, hydraulic and electronic systems. Access to these systems, for example for maintenance purposes, can often only be made from the outside or inside of the aircraft by removing panels. In order to protect the systems from environmental influences such as water ingress, a reliable panel sealant is required.

In the past two-component sealants have been mixed and applied to the aircraft structure with a gun or a spatula. Controlled ambient conditions, a limited pot life as well as long curing times (usually 24 hours but can be longer depending on air humidity and temperature) are characteristic of this method. Polysulphide is an example of such a sealant material. Furthermore, the sealants are difficult to remove when they have to be replaced. The replaced sealants have to be disposed after use with special waste techniques for poisonous waste.

W. L. Gore & Associates have developed a range of sealant tapes sold under the name of SKYFLEX® which overcome these problems. They have none of the above limitations and do not require the use of protective measures during installation. The sealant tapes are described in more detail in the German Patent Application DE-A-37 26 853 (Forrest et. al.).

The SKYFLEX® sealant tapes are manufactured from expanded polytetrafluoroethylene (ePTFE). This material is chemically inert and not affected by any common chemical. It functions over a wide temperature range (−240° C. to +260° C.), does not age and is weather and UV resistant. The ePTFE used in SKYFLEX® sealant is manufactured by the GORE® expansion process. The result is a material which combines the above advantages with high pressure resistance. In addition the material conforms perfectly to irregularities in sealed surfaces.

Figure 1:
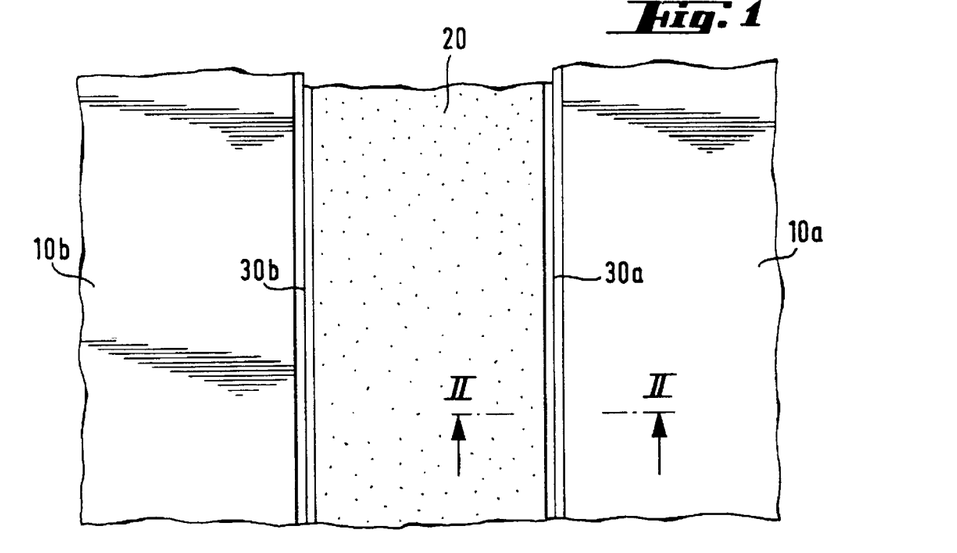
FIG. 1 shows a top view of a sealant between two metal parts.
Figure 2:
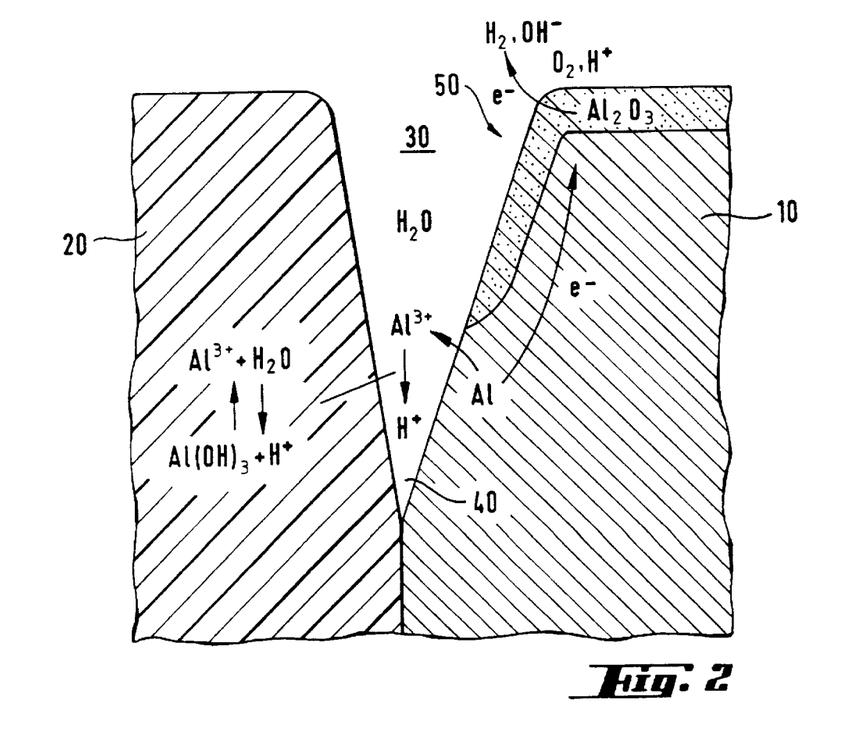
FIG. 2 shows a side view of a crevice.

As well as in aircraft the sealant tapes are currently finding application in other systems such as cars and trains in which reliable panel sealants are required. All of these systems also suffer from corrosion problems around the panels. FIGS. 1 and 2 illustrate these problems. FIG. 1 shows a top view two metal parts 10a, 10b made in this example of aluminium alloy between which is placed a sealant 20. At the boundary between the metal parts 10 and the sealant 20, joins 30a and 30b are formed. The joins 30a and 30b behave like a crevice 30 (such as illustrated in FIG. 2) on the metal surface but in macroscopic dimensions.

In FIG. 2 a side view of the metal crevice 30 is depicted. Within the join 30 oxygen diffusion is hindered. The hindered diffusion of oxygen leads to a depletion of oxygen within a lower or inner part 40 of the join 30. As a result the inner part 40 of the join 30 shows a reduced electrochemical potential compared with an upper or outer region 50 of the join 30 which is fully covered with aluminium oxide. This difference in electrochemical potential initiates an electrochemical reaction. In the inner part 40 of the join 30, aluminium ions will be generated. In a second reaction, these ions will be hydrolysed which causes the generation of acid. The existence of acid within the join 30 accelerates the metal dissolution which in turn further accelerates the corrosion.

Corrosion is reduced in two component sealants by adding corrosion-inhibiting substances such as chromates or phosphates to the two component sealant. These corrosion-inhibiting substances are, however, mostly very toxic and have the disadvantage that they need to be dispersed within the sealant mass. They are only effective in a limited area and experiments have shown that with time they tend to lose their activity and dissipate out of the sealant mass and thus the anti-corrosion properties of the sealant diminish. The corrosion-inhibiting substances work by increasing the electrochemical potential of the metal surface and thus leading to a temporary passivation of the surface.

The U.S. Pat. No. 4,028,324 (Tuschner et al.), assigned to United Technologies Corporation, illustrates a method for improving the chemical resistance of a sealant for a phosphoric fuel cell. The sealant used is an extruded seal material, the composition of which consists essentially of ePTFE, a halogenated oil, 0–5% by weight of a halogenated solvent and a filler stable in phosphoric acid and compatible with PTFE. This sealant is manufactured by mixing PTFE, fluorocarbon oil, solvent and filler in a mixer. After the components are mixed, it is allowed to dry and the solvent evaporates. The compound is afterwards extruded into the form of tape by means of a ram extruder.

Because of environmental concerns, the teachings of this patent are, however, nowadays of limited relevance. The use of CFCs is increasingly being avoided due to their known detrimental effects on the ozone layer in the atmosphere.

The taught manufacturing method also has a number of disadvantages as the addition of PFPE to PTFE prior to the extrusion of PTFE is only possible in a limited way. Firstly, the PFPE must completely saturate the PTFE which requires a low surface energy and viscosity of PFPE (i.e. less than 24 mN/m). Secondly the proportion of PFPE in relation to PTFE can only be chosen in a limited range. If the proportion is too low, for example under 30%, then the material can no longer be extruded as the extrusion pressure required is too high. If the share of PFPE is too high, then the extrusion pressure falls. However, the extruded material is then not adequately stable to allow its use as sealants. A further disadvantage is that Tuschner mentions that the material needs only to be stable to 240° C. (400° F.). However, expanded PTFE requires sintering at temperatures of above 250° C. Thus the teachings of Tuschner cannot be applied to the manufacture of expanded PTFE with PFPE.

In WO-A-92/21715 (Chung) assigned to the Donaldson Company Inc. the use of ePTFE which has been treated with a non-functionalised perfluoropotyether (PFPE) fluid prior to or after expansion as a mechanical seal is described. The inventor of this patent application recognised that the system described in this application offered improved radiation resistance properties. However, there is no hint in the patent application that sealant material made from this material could furthermore be resistant to corrosion.

Similarly JP-A-61-163944 (Omori) assigned to Daikin Industry Ltd. teaches the incorporation of a non-functionalised PFPE compound into ePTFE for use as a diaphragm in a sensor. This patent application also does not teach the anti-corrosion properties of the PFPE/PTFE system.

The incorporation of both functionalised and non-functionalised PFPE into ePTFE is also taught in DE-A-43 08 369 (Bürger) assigned to W. L. Gore & Associates. This patent application teaches that the system possesses improved oleophobic properties. However, the disclosure fails to teach that this system also shows anti-corrosion properties.

The object of the invention is therefore to provide a sealant with improved anti-corrosion properties.

A further object of the invention is to provide an improved manufacturing method for a sealant with improved anti-corrosion properties.

A further object of the invention is to provide a sealant made of microporous material which incorporates corrosion inhibitors within the body of the microporous material.

This object is achieved by providing a sealant material which before use consists essentially of a) 30–90% by weight porous base material and b) 10–70% by weight corrosion inhibitor having the requirements that it is compatible with said porous material. The words "by weight" as used in the current patent refer to a weight of the sealant or of the corrosion inhibitor as a proportion of the total weight of the sealant plus corrosion inhibitor. This combination of materials is non-toxic and is easy to apply between two metal parts, requiring no special tools and no setting time. Furthermore the sealant material is easy and cheap to manufacture requiring no special mixing steps prior to the expansion of the polytetrafluoroethylene.

The corrosion inhibitor used in the invention has preferably at least a group which is polar in nature. This aids the building of a film on the surface of the metal parts to protect the metal parts from attack by corrosive materials.

The corrosion inhibitor in the sealant material is selected from the group consisting of perfluoropolyether, polysiloxane, polybutadiene, butadiene-acrylonitrile co-polymers, ethylene-propylene co-polymers, ethylene-propylene-diene co-polymers, ethylene-butylene co-polymers, fluoroalkyl surfactant polymers, and polyesters. It has been found that a particularly suitable corrosion inhibitor is perfluoropolyether or a functionalised derivative thereof. This corrosion inhibitor is easy to obtain and prevents corrosion on aluminium plates reliably.

The corrosion inhibitors are preferably functionalised by the addition of a polar group selected from the group consisting of carboxylic acids, carboxylates, alcohols, mono-, di- and triesters of phosphoric acid, salts of phosphoric acids and carboxylic acids, silane, amines, ethers, isocyanates, urethanes, thiols, dithiols, esters, amides, maleic anhydride or acetates as well as fluorinated derivatives thereof.

The base sealant is typically selected from the group consisting of polytetrafluoroethylene and expanded polytetrafluoroethylene which have been shown to be non-toxic and highly effective sealants. However, it would be possible to use other sealant materials in this invention as long as they are porous. Examples of such materials are those produced by phase separation processes such as polycarbonates, polyvinylidene fluoride, polypropylene, polysulfone, nylon, cellulose acetates and thermoplastic polyurethanes and foams suchas polyurethane or polysiloxane.

Furthermore, sealants can also be made from blends and composites of ePTFE with glass, ceramics, carbon black and thermoplastics. Blends of ePTFE with thermoplastics such as PEEK (Poly-(Ether-Ether-Ketone)) and UHMW-PE (Polyethylene with high molecular weight) are known from the co-pending German Patent Application DE-A-196 38 416.8.

Experiments have shown that the good anti-corrosion results are obtained when the sealant material before use consists of a) 30–90% by weight expanded polytetrafluoroethylene and b) 10–70% by weight corrosion inhibitor. Preferably a sealant material is used which before use consists of 40–60% by weight expanded polytetrafluoroethylene and 40–60% by weight corrosion inhibitor.

The method for manufacturing sealant material with anti-corrosion properties comprises the following steps:

a) a first step of manufacturing a porous base sealant material, b) a second step of preparing a fluid comprising at least a corrosion inhibitor, c) a third step of applying said base sealant material to said fluid for a specified period of time and d) a fourth step of drying to base sealant material to form the sealant material with anti-corrosion properties.

Compared to the prior art methods, this provides a very cheap and easy method of introducing anti-corrosion properties into a sealant.

In a preferred embodiment of the invention, the porous base sealant material is dipped into a fluid which is a mixture of a corrosion inhibitor and a further fluid. This has been found to be the most practical method of ensuring that the corrosion inhibitor is absorbed into the body of the porous base sealant. However, it would also be possible to spray, roll or brush the corrosion inhibitor onto the surface of the base sealant material Experiments have also shown that it is possible to spray the pure additive in liquid form onto the surface of the porous base sealant material.

The mixture into which the base sealant material is dipped is a solution, dispersion or suspension of corrosion inhibitor in another fluid. In one advantageous embodiment, the mixture is a solution in which the solute is the corrosion inhibitor having the requirements that it is compatible with polytetrafluoroethylene and has a group which is polar in nature. The solvent is typically selected from the group consisting of alcohols, ketones, alkanes, water or perfluoropolyethers or mixtures thereof. In one advantageous embodiment of the invention, the solvent is an alcohol and the corrosion inhibitor is perfluoropolyether. This combination allows the manufacture of effective sealants with anti-corrosion properties. The perfluoropolyether has the major advantage compared to prior art corrosion inhibitors in that it is non-toxic and not detrimental to health. Furthermore, it is known that this material does not damage the ozone layer which is of great importance for sealants incorporated into aircraft flying high in the atmosphere.

Good results for manufacturing sealant material with anti-corrosion properties have been obtained wherein said mixture consists of a) 50–80% by weight corrosion inhibitor and b) 20–50% by weight solvent. The drying step (fourth step) in one embodiment of the invention comprises a) a step of drying for a specified period of time at room temperature and atmospheric pressure and b) a step of drying for a specified period of time in vacuum.

It would also be possible to heat the sealant material in order to speed up the drying process.

The manufactured sealant can be used in a system of two metal plates 10a, 10b which are separated by the sealant 20. This system typically finds an application in transportation vehicles, such as an aircraft, in which corrosion is a serious problem. The manufactured sealant can furthermore be used as a sealant between disimilar material such as metal and plastic.

Figure 3:
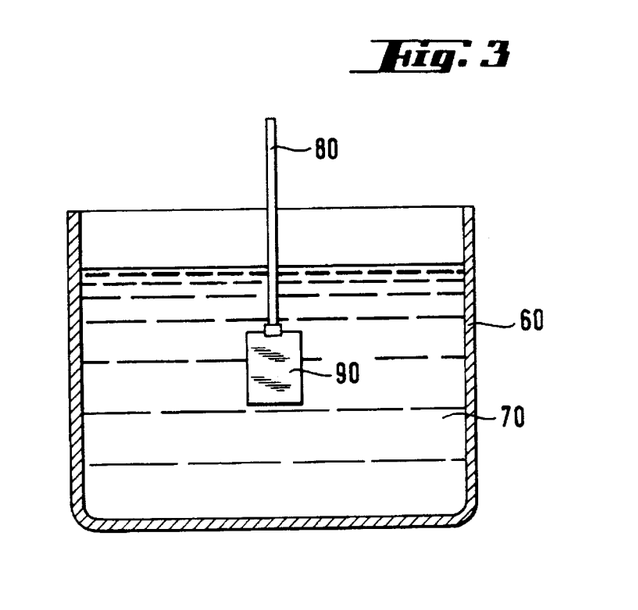
FIG. 3 shows a simplified overview of the apparatus used for manufacturing the sealant according to the invention.

The apparatus used for the manufacture of the sealant according to the invention is depicted in FIG. 3. It consist of a vat 60 in which a solution 70 of a corrosion inhibitor and a solvent is to be found. A sealant 90 is dipped into the solution 70 by means of a holder 80.

Manufacture of the sealant according to the invention is carried out as follows. Firstly a sealant tape 90 is manufactured according to the known prior art methods. One example of such a sealant tape is the SKYFLEX® sealant tapes which are manufactured by W. L. Gore & Associates. These sealant tapes are made by extruding and then stretching PTFE.

Figure 4:
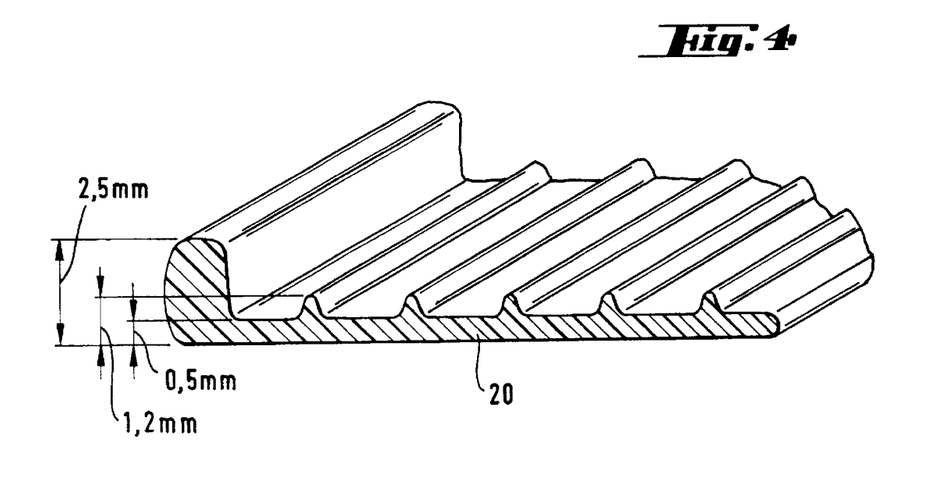
FIG. 4 shows the design of a sealant.

The PTFE can be uniaxially stretched or biaxially stretched. An example of one such tape, sold under the part number GO-AS-0001, is shown in FIG. 4. The geometry of the tape is chosen to make it suitable for the particular application and is not limiting of the invention. For example, the tapes might be completely flat or they could have ribs of different heights and in different locations. In this example, the ePTFE has re-densified to a density of 0.5 g/cm$^3$. However, sealant tapes with other densities can be used if required by the application.

In a second step a corrosion inhibitor is mixed with a solvent in the vat 60. In one embodiment of the invention the inhibitor used is polar PFPE (Perfluoropolyether) and the solvent used a fluorinated solvent. Suitable PFPEs for this purpose are supplied by Ausimont under the trade names FOMBLIN-Z® and FLUOROLINK™. A suitable fluorinated solvent is a PFPE of low molecular weight. These examples are only meant to illustrate suitable materials for the performance of the invention. Further examples of suitable materials will be given later. The PFPEs used are preferably functionalised with one or two polar head groups and have the following general structure:

where —OR is an alkoxygroup.

The sealant tape 90 is then dipped into the solution 70 in the vat 60. The sealant tape 90 remains submerged for a period varying between 30 seconds and 5 minutes. The submergence time needs to be sufficiently long to ensure that the sealant tape 90 becomes saturated with the solution 70. The exact length of time depends not only on the concentration of the solution but also on the geometry of the sealant tape 90 which is to be treated.

As is known, a material such as ePTFE has large voids within its structure. The solution 70 is absorbed within the voids. When these voids are completely filled, the sealant tape 90 can no longer absorb more solution 70. It is at this point that the sealant tape can be removed from the solution. The length of time in which the sealant tape is kept in the solution can be shortened by stirring the solution 70 whilst the sealant tape 90 is in the vat 60 or by using ultrasound to promote mixing of the solution 70 and absorption by the sealant tape 90.

The sealant tape 90 can alternately be sprayed, rolled or brushed with the corrosion inhibitor directly or with a solution 70 containing the corrosion inhibitor.

After removal from the solution 70, the sealant tapes 90 are dried. The length of drying also depends on the geometry of the sealant tape 90 and the components of the solution 70 as well as on the atmosphere in which the drying occurs. The sealant tape 90 should be dried for a sufficient length of time in order to ensure that all the solvent is evaporated from the sealant tape 90. A typical drying time at room temperature in the open air for the embodiment cited above would be four hours. Warming the sealant tape 90 or placing it in vacuum will shorten the necessary drying time. After evaporation of the solvent, the sealant tapes 90 can be weighed. It is found that they have an increase in weight typically between 10% and 130%. Good anti-corrosion properties have been obtained for those sealant tapes in which the weight increase has been above 20% as will be shown later.

The sealant tapes 90 are now ready for application. The sealant tapes 90 have been found to be suitable for sealing aircraft panels. They are furthermore suitable for sealed metal parts on other transportation vehicles which are susceptible to corrosion, such as those on cars and in trains. The sealant tapes could equally well be used on stationary objects such as battery fuel cells which are filled with aggresive compounds.

Figure 5A:
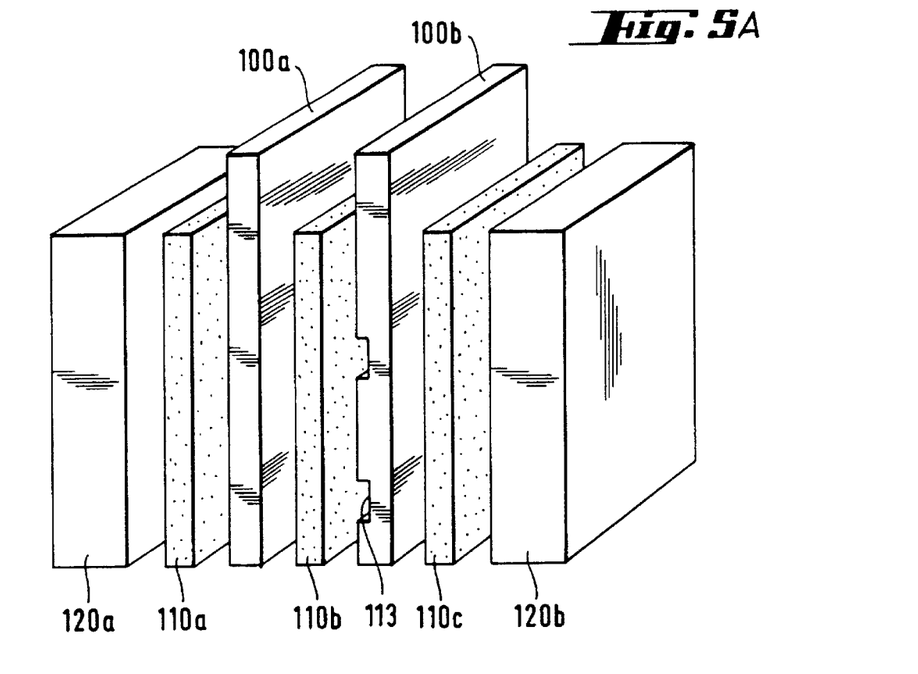
FIG. 5 shows an overview of the experimental apparatus used for determining the extent of corrosion on aluminium alloy plates separated by a band sealant manufactured according to this method.

In order to demonstrate the anti-corrosion properties of the sealant tapes manufactured by the described method, an experimental apparatus as shown in FIG. 5A was constructed. Two aluminium plates 100a and 100b were pressed together by two PTFE blocks 120a, 120b. Between the aluminium plates 100a and 100b and the blocks 120a and 120b, sealants 110a, 110b and 110c made according to the above method were introduced. One of the aluminium plates 100a or 100b was provided with one or more slits 113 within of the table shows the mass increase of the ePTFE after evaporation. The fifth column of the table shows whether and which type of inhibitor was included in the solution 70. In the examples of the table, four types of PFPE were used. MF201 and MF407 are monofunctional PFPEs which are available from Montefluos. The PFPEs were either used alone or as a mixture. Additionally, as a control, the corrosion of aluminium which was sealed by sealant tapes incorporating no PFPE was investigated using the same experimental apparatus. These control investigations are indicated by the word "non" in the fifth column of the table.

TABLE 1

| Sample No. | Sealing | Content classical inhibitor | Mass increase PFPE (%) | PFPE | Corrosion at constant corrosion rating | Potential exposure time | Free corrosion rating | Exposure time |
|---|---|---|---|---|---|---|---|---|
| C | Go Ts 0008 | 0 | 0 | none | O | | XX | |
| L1aC | " | 0 | 12.5 | MF 201 | X | 71 h | O | 68 d |
| L1bC | " | 0 | 34.9 | MF 201 | XXXX | | XXX/OO | |
| L1cC | " | 0 | 57 | MF 201 | XXX | | X | |
| C | Go Ts 0008 | 0 | 0 | none | O | | | |
| L2aC | " | 0 | 21.4 | MF 407 | XX | | O | |
| L2bC | " | 0 | 60.6 | MF 407 | XX | 72 h | O | 68 d |
| L2cC | " | 0 | 102 | MF 407 | XXX | | O | |
| C | Go Ts 0008 | 0 | 0 | none | O | | O | |
| L1a2aC | " | 0 | 11.4 | MF 201 / MF 407 | XX | 152 h | XXX | 68 d |
| L1b2bC | " | 0 | 39.7 | MF 201 / MF 407 | X | | X | |
| L1c2cC | " | 0 | 68.3 | MF 201 / MF 407 | XX | | OO/XX | |
| B | Go As 0001 | 0 | 0 | none | | | | |
| L6B | " | 5 | 0 | " | | | | |
| L6aB | " | 15 | 0 | " | XX | 88 h | O | 49 d |
| L6bB | " | 10 | 0 | " | | | | |
| L6B | Go As 0001 | 5 | 0 | none | X | | O | |
| L6/1aB | " | 5 | 6.8 | MF 201 | XX | 71 h | O | 49 d |
| L6/1bB | " | 5 | 19.4 | MF 201 | XXX | | X | |
| L6/2aB | " | 5 | 14.3 | MF 407 | XXX | | O | |
| L6/2bB | " | 5 | 36.8 | MF 407 | | | O | |
| L6/1c2cB | " | 5 | 48.8 | MF 201 / MF 407 | XXX | | O | |
| C | Go Ts 0008 | 0 | 0 | non | | | | |
| L7aC | " | 0 | 126 | Fluorolink C | XXX | 72 h | XXXX | 68 d |
| L8aC | " | 0 | 106 | Fluorolink D | XXX | | XXXX | | the gap to allow an electrolytic medium to attack the aluminium in the inner part of the gap.

Two experiments were used to test the sealants. In a first experiment shown in FIG. 5B, the aluminium alloy plates 100a, 100b were placed in a vat 130 with a brine solution. A constant potential was applied to the two plates by means of the electrode 140 and potential source 150. A reference electrode 145 is introduced into the brine solution in order to measure and to adjust the potential of the aluminium alloy plates 110a and 110b. The surface structure of the aluminium plates 110a, 110b was characterised by observation. In the second experiment, no potential was applied. This experiment simulated free corrosion conditions.

The results of the experiments from potentiometric and optical detection are summarised in table 1. The first column of the table is merely the sample number. The second column shows the type of sealant tape used. The letters refer to part numbers of SKYFLEX® tape sealants available from W. L. Gore & Associates. The third column shows the proportion of "classical" inhibitors used. These traditional inhibitors, such as zinc-aluminium polyphosphate, are pre-blended with the PTFE prior to extrusion. The fourth column The results of corrosion at constant potential are shown in the sixth column of the table for the periods of time given in hours in the seventh column. A O in the table indicates that the metal plates were fully corroded, a single X indicates severe corrosion and XXXX represents little or no corrosion observable. Similarly the seventh column shows the results of free corrosion experiments for time periods shown in days in the eighth column.

As will be seen from the table, corrosion is severe when no inhibitor (in this example PFPE) is incorporated into the sealant tape. However, corrosion is reduced when the weight of the sealant tape is increased due to absorption of the PFPE. The more PFPE that is incorporated into the tapes, the better the results that are obtained.

Figure 6A:
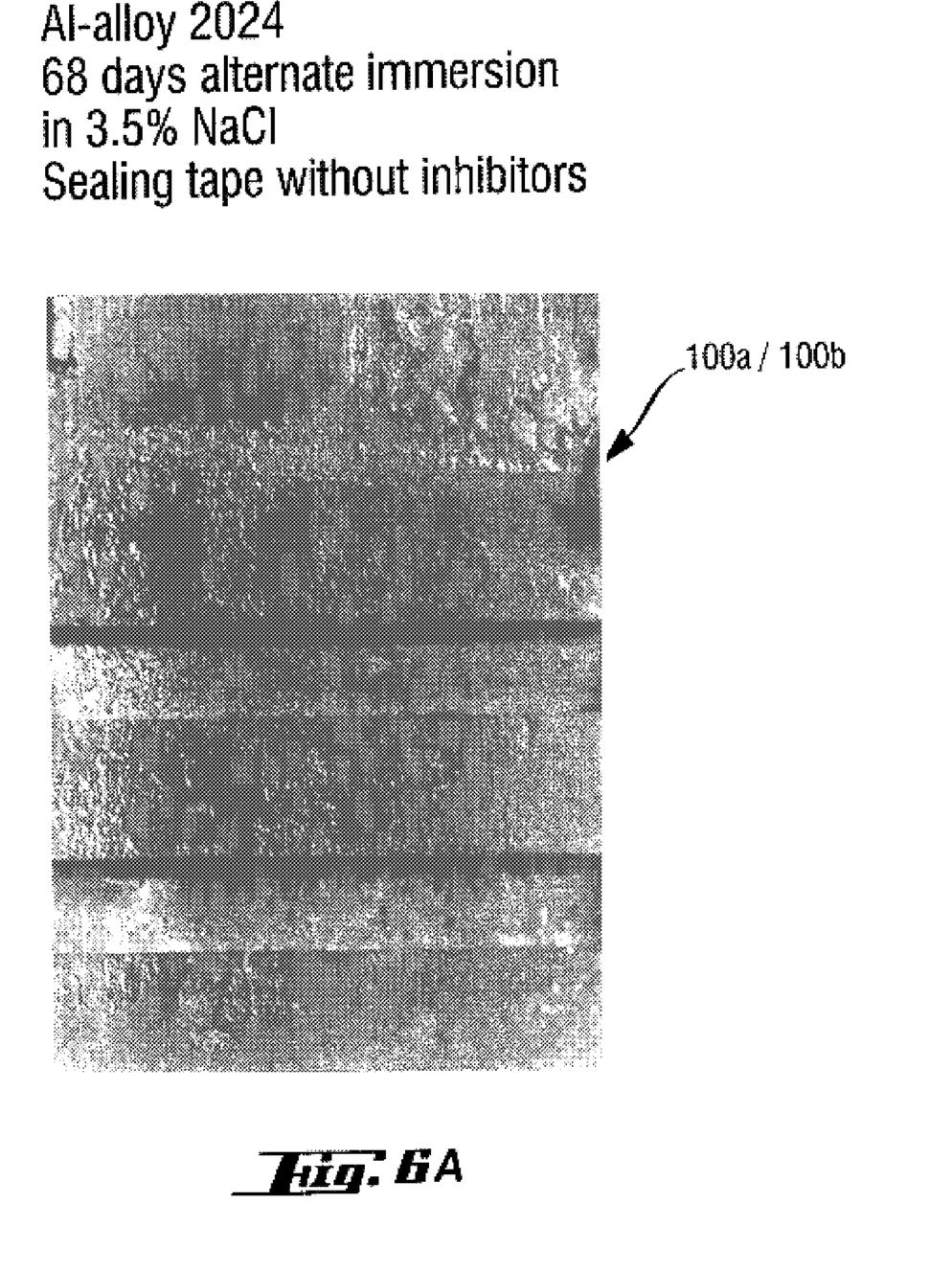
FIG. 6 shows photographs of corrosion problems.
Figure 6B:
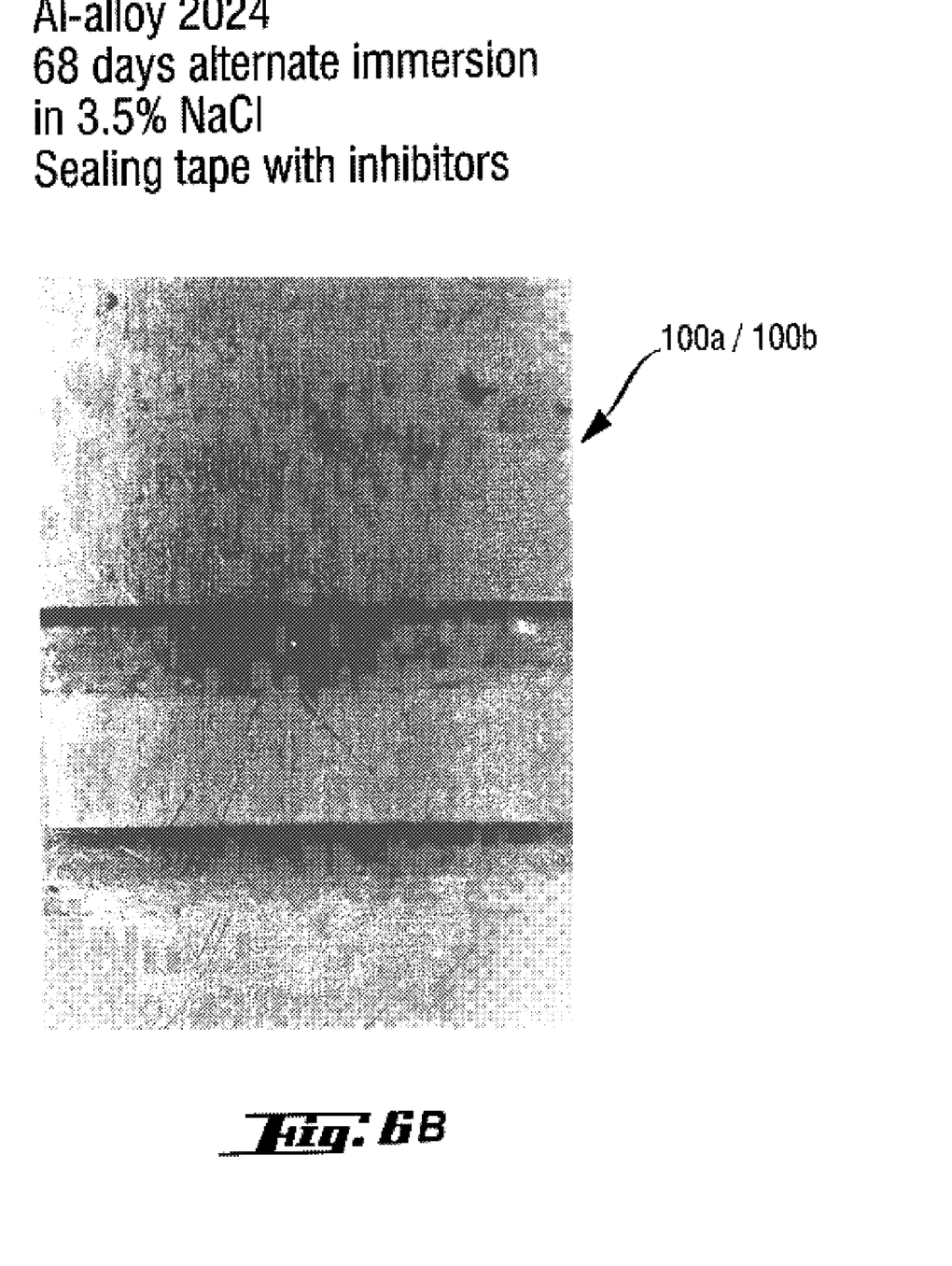

FIG. 6 shows the results of optical observation of a slit within one of the aluminium plates 100a or 100b. FIG. 6A shows the results of corrosion after the aluminium plate 100a, 100b was placed in the brine solution 130 for 68 days and a constant potential applied. In this example, the sealant 110 used did not contain any corrosion inhibitor, In FIG. 6B the sealant 110 had a corrosion inhibitor added to it in accordance with the invention. It will be observed, that no corrosion is observable.

Figure 5B:
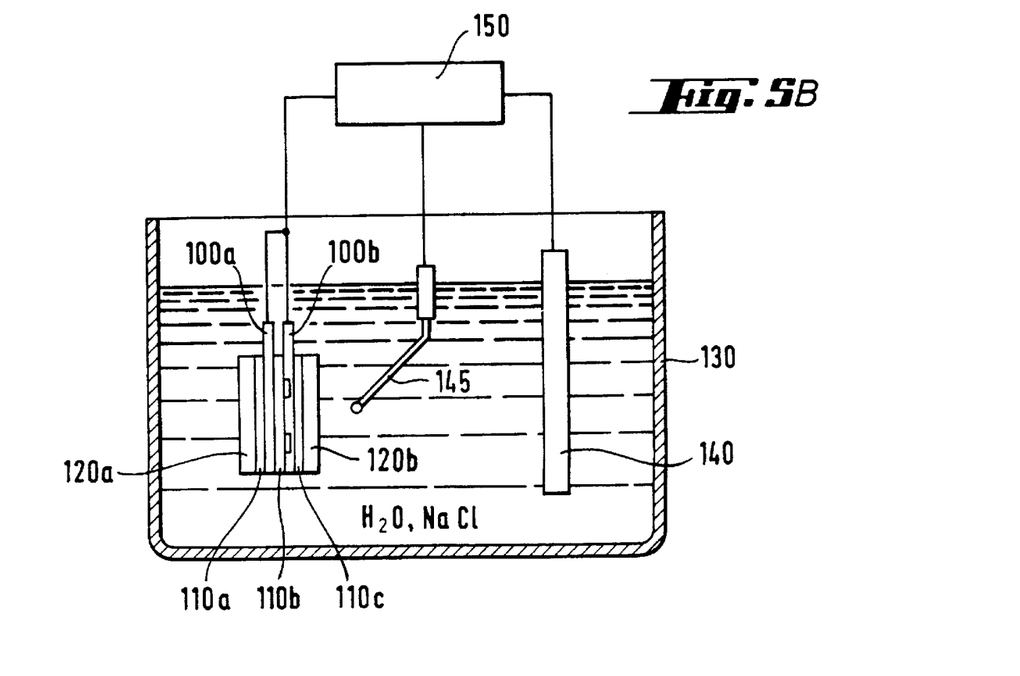

A further experiment was made to quantify the extent of protection against corrosion offered by the various corrosion inhibitors. The same experimental apparatus as depicted in FIGS. 5A and 5B was employed and the depth of damage at the top and bottom of the slit in plate 100b and also on the other side of the plate 100b was measured. The results are shown in Table 2.

In the table "whole area" means that damage were observed over the whole area of the aluminium plates 100a and 100b. "Some" means that some damage was observed either in a limited area of the aluminium plates 100a and 100b or homogeneously distributed over the aluminium plates 100a and 100b.

The addition of inhibitors to the sealant material has been shown to have further advantages. In particular, when the weight increase of the sealant material is greater than 70%, the sealant material has better sealant properties.

In the above examples, the inhibitor used to fill the sealant material was PFPE. However, the invention is not limited to the use of this type of inhibitor. Investigations have shown that the invention works by allowing the inhibitors in use to seep out of the sealant material and form a film on the surface of the metal parts 10 which have to be sealed. This film then protects the metal parts 10 from corrosion. Thus

TABLE 2

| Corrosion inhibitor used in ePTFE | Depth of damage on Opposite side (mm) | Depth of damage on surface of plate between slits (mm) | Depth of damage in Slit (lower part) (mm) | Distribution of damage |
|---|---|---|---|---|
| No corrosion inhibitor | 0.25 | 0.015 | 0.055 | whole area |
| MF 201 | 0.15 | 0.01 | 0.04 | whole area |
| FLUOROLINK C | 0.01 | 0.005 | 0.003 | some (limited area) |
| FLUOROLINK D | 0.003 | 0.003 | 0.003 | whole area |
| DA 306 | 0.11 | 0.04 | 0.05 | whole area |
| Fomblin FE 20C | 0.04 | 0.003 | 0.025 | whole area |
| Fomblin Vac 25/6 | 0.085 | 0.065 | 0.115 | whole area |
| MF 201 / Vac 25/6 | 0.12 | 0.005 | 0.035 | whole area |
| Nuva LE | 0.12 | 0.015 | 0.03 | whole area |
| Hoe T 4334 | 0.05 | 0.01 | 0.035 | some (homogeneous distribution) |

The results obtained show that functionalised PFPE liquids with a phosphate group (MF 201) and a silane group (MF 407) show a low or medium anti-corrosion activity. Functionalised PFPE liquids with a carboxylic group (FLUOROLINK C) or hydroxyl group (FLUOROLINK D) show much better anti-corrosion activity probably due to the good adhesion of the PFPE liquid on the surface of the metal.

Figure 7:
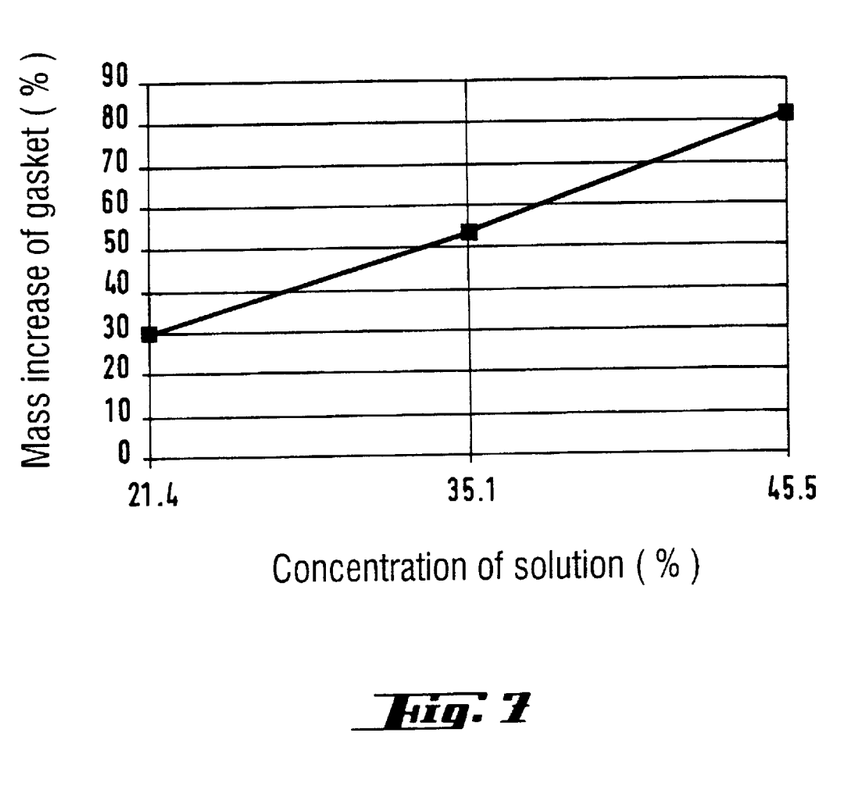
FIG. 7 shows a graph of weight increase of the sealant against concentration of an inhibitor in solution.

It has been found that the mass or weight increase of the sealant material manufactured by this invention can be controlled by altering the concentration of the inhibitor in the solution 70. This is illustrated in FIG. 7.

In this example, a GORE SKYFLEX® GO-TS-0008/4 sealant tape was placed in one of three types of solutions for three minutes and the solution stirred. The sealant tape was then dried for 12 hours at room temperature and pressure followed by two hours in an oil vacuum pump. The results from the three solutions can be summarised in Table 3.

other suitable materials for use as corosion inhibitors must have the following properties: they must be compatible with the sealant material 20 to be used (in this case ePTFE) and thus be capable of being substantially uniformly distributed throughout the base sealant material; they must be capable of forming a waterproof film on the surface of the metal; therefore they should be hydrophobic. The corosion inhibitors can also be advantageously oleophobic.

Experiments have furthermore shown that inhibitors most advantageously used have a so-called anchor group which is polar or substantially polar in nature. These anchor groups are then attracted by the potential on the surface of the metal parts 10 to be sealed. For example, the carboxyl group —COOH is polar and is known to adhere well to the surface of aluminium oxide which is formed naturally on the surface of aluminium metal plates. Carboxylic acid salts are also polar and adhere well to the surface of steel.

The kinetics of the formation of thin layers of organic films on metal parts is described in the book "An introduc-

TABLE 3

| Solution Number | Weight of PFPE MF201 (g) | Weight of isopropanol-alcohol (g) | % wt PFPE in solution | Weight of SKYFLEX ® before absorption (g) | Weight of SKYFLEX ® after absorption (g) | % wt increase of SKYFLEX ® |
|---|---|---|---|---|---|---|
| 1 | 15 | 55 | 21.4 | 6 | 7.8 | 30.0 |
| 2 | 20 | 37 | 35.1 | 7.7 | 11.8 | 53.2 |
| 3 | 25 | 30 | 45.5 | 7.2 | 13.1 | 81.9 |

As can be seen from the graph in FIG. 7, the weight increase of the sealant material is linearly proportional to the concentration of the inhibitor in solution 70.

tion to Ultrathin Organic Film, From Langmuir-Blodget to Self Assembly" by Abraham Ulman, San Diego: Academic Press, 1991.

Taking these requirements into consideration, the materials given in table 4 were tested.

TABLE 4

| Trade Name | Composition | Manufacturer |
| --- | --- | --- |
| MF 201 | PFPE, terminal one phosphate group | Ausimont |
| MF 407 | PFPE, terminal one silane group | Ausimont |
| FLUOROLINK C | PFPE, terminal two carboxylic acid groups | Ausimont |
| FLUOROLINK D | PFPE, terminal two hydroxyl groups | Ausimont |
| DA 306 | PFPE, ammonium salt functionalised | Ausimont |
| Fomblin FE 20C | PFPE, ammonium salt functionalised | Ausimont |
| Fomblin Vac 25/6 | PFPE, not functionalised | Ausimont |
| Hoe T 4334 | Fluorosilicone urethane functionalised | Hoechst AG |
| NUVA LE | Fluorosilicone | Hoechst AG |
| Trilene M-101 | Ethylene-propylene copolymer, epoxy functionalised | Uniroyal Chemical |
| Trilene M-301 | Ethylene-propylene copolymer, maleic.anhydr. functionalised | Uniroyal Chemical |
| Kraton Liquid L-1203 | Ethylene-butylene copolymer, hydroxyl functionalised | Shell Chemicals |
| EL Vernetzer W | Hydrogen functionalised polysiloxane | Wacker Chemie |

The functionalised fluorosilicones have the following general structure:

The functionalised polysiloxane has the following general structure:

and a functionalised olefin copolymers (ethylene-butylene copolymer) has the general structure:

where the head groups can be the same as those given above for PFPE.

To summarise, it is thought that the following materials suitable for use as inhibitors incorporated into PTFE.

PFPE or functionalised PFPE. In particular PFPE which has been functionalised by the addition of a polar group such as carboxylic acids, carboxylate, alcohol, mono-, di- and triesters of phosphoric acid, salts of phosphoric and carboxylic acids, silane, amine, amides, esters, ethers, isocyanates, urethanes, thiol and dithiol. Such compounds are manufactured by Ausimont and sold under the trade names GALDEN, FORMBLIN and FLUOROLINK.

Polysiloxane, functionalised polysiloxane or fluorinated polysiloxane. The same functional groups as listed above can be used. Polysiloxane is available from Wacker Chemie. Functionalised polysiloxanes are available from Wacker Chemie or Dow Chemicals. Fluorinated polysiloxanes are available from Hoechst under the trade name NUVA., Polybutadiene available from Hüls AG under the trade name Polyöl. Functionalised polybutadiene with similar functional groups to those listed above. These are available from Goodrich Chemical under the trade name Hycar. Butadiene-acrylonitrile co-polymers and functionalised butadiene-acrylonitrile co-polymers. These are also available from Goodrich Chemical.

Polyolefine copolymers such as ethylene-propylene co-polymers (so-called EPM polymers manufactured by Uniroyal), ethylene-Propylene-Diene polymers (termed EPDM co-polymers), functionalised EPM and EPDM co-polymers with the functional groups listed above and terpolymers on the basis of EPM and EPDM co-polymers as well as their functionalised derivatives. Additionally ethylene-butylene co-polymers such as Kraton L-1203 manufactured by Shell Chemicals are thought suitable for use.

Fluoroalkyl surfactant polymers (termed FSP) which are described in U.S. Pat. No. 4,929,666 (Schmidt et al.) assigned to The Dow Chemical Company and obtainable from 3M Corp.

Polyesters and polyethers as well as co-polymers or block co-polymers made from polyester, oligoester, polyether, oligoether, fluoroalkyls, siloxane or olefin units.

Fluid or wax-like inhibitors of low molecular weight such as silane, carboxylic acids and derivatives thereof (e.g. esters, salts and amides), alkane, thiol and dithiol compounds.

The additives are not restricted to the depicted linear molecules. The effectiveness of the additives as a corrosion inhibiting material is ensured by the presence of oleophobic polymer chains with a low content of polar groups. Thus additives with a nonlinear chain structure, for example a comb-like, star-like, cyclic or dendritic structure are contemplated to be also effective as additives.

It should be furthermore noted that the polar groups can be either attached at the end of the polymer chain or they can be incorporated in the main chain or side chains of the polymer.

The following can be used as solvents for the above listed inhibitors:

Alcohols (e.g. isopropanol IPA)

Ketones, e.g. methylethylketone, methylbutylketone

Chlorinated hydrocarbons e.g. methylene chloride, chloroform

Alkanes

PFPE of low molecular weight

Water

Mixtures of the above solvents

In the description it has been assumed that the fluid used is a solution of a solvent and an inhibitor. However, it would also be possible to use a dispersion or a suspension of the inhibitor in an aqueous or alcohol base. The sealant material could also be placed into a fluid which consisted solely of the corrosion inhibitor in liquid form without the presence of a solvent.

Furthermore it is possible to use other methods for applying the corrosion inhibitor to the sealant material. For example, the corrosion inhibitor could be sprayed, rolled or painted onto the surface of the sealant material from where it would be absorbed by the sealant material into the pores.

Furthermore, it has been assumed in this description that the base sealant material used is expanded polytetrafluoroethylene. However, other materials could be used as long as they have the characteristics that they are good sealant materials and are also sufficiently porous to allow absorption of the inhibitor within the pores of the material. Examples of such materials are materials produced by phase separation processes, such as polycarbonate, polyvinylidene fluoride, polypropylene, polysulfone, nylon, cellulose acetates, and foams such as polyurethane or polysiloxane.

What is claimed is:

1. A combination system of at least one metal plate and a further plate which are separated at a joint by a sealant material which before use consists essentially of
   a) 30–90% by weight porous base material and
   b) 10–70% by weight functionalized fluorosilicone distributed within said porous base material, whereby said functionalized fluorosilicone has been functionalized by the addition of one or more polar groups.

2. The system according to claim 1 wherein said porous base material is selected from the group consisting of polytetrafluoroethylene, expanded polytetrafluoroethylene, blends of polytetrafluoroethylene with fluoropolymers, materials made from phase separation processes or polymer foams.

3. The system according to claim 1 wherein said porous base material is expanded polytetrafluoroethylene.

4. The system according to claim 1 wherein said functionalized fluorosilicone has been functionalized by the addition of one or more polar groups selected from the group consisting of carboxylic acid, carboxylates, alcohols, mono-, di- and triesters of phosphoric acid, salts of phosphoric or carboxylic acids, silane, amines, amides, esters, ethers, isocyanates, urethanes, thiol, dithiol and maleic anhydrides.

5. The system according to claim 4 wherein said functionalized fluorosilicone is functionalized by the addition of at least one urethane group.

6. The system according to claim 1 wherein the sealant material before use consists of
   a) 40–90% by weight expanded polytetrafluoroethylene
   b) 10–60% by weight functionalized fluorosilicone.

7. The system according to claim 6 wherein the sealant material before use consists of
   a) 30–60% by weight expanded polytetrafluoroethylene
   b) 40–70% by weight functionalized fluorosilicone.

8. A method of preventing corrosion between a metal plate and a further plate placed together at a joint comprising:

applying to the joint a sealant material which consists essentially of
   a) 30–90% by weight porous base material and
   b) 10–70% by weight functionalized fluorosilicone distributed within said porous base material whereby said functionalized fluorosilicone has been functionalized by the addition of one or more polar groups.

9. The method according to claim 8 wherein said porous base material is selected from group consisting of polytetrafluoroethylene, expanded polytetrafluoroethylene, blends of polytetrafluoroethylene with fluoropolymers, materials made from phase separation processes or polymer foams.

10. The method according to claim 8 wherein said porous base material is expanded polytetrafluoroethylene.

11. The method according to claim 8 wherein said functionalized fluorosilicone has been functionalized by the addition of one or more polar groups selected from the group consisting of carboxylic acid, carboxylates, alcohols, mono-, di- and triesters of phosphoric acid, salts of phosphoric or carboxylic acids, silane, amines, amides, esters, ethers, isocyanates, urethanes, thiol, dithiol and maleic anhydrides.

12. The method according to claim 11 wherein said functionalized fluorosilicone is functionalized by the addition of at least one urethane group.

13. The method according to claim 10 wherein the sealant material consists of
   a) 40–90% by weight expanded polytetrafluoroethylene
   b) 10–60% by weight functionalized fluorosilicone.

14. The method according to claim 13 wherein the sealant material before use consists of
   a) 30–60% by weight expanded polytetrafluoroethylene
   b) 40–70% by weight functionalized fluorosilicone.

* * * * *